May 14, 1957 F. SPIECKER 2,792,453

AUTOMATIC TELEPHONE SYSTEM OF THE RELAY TYPE

Filed Oct. 25, 1952 7 Sheets-Sheet 1

Inventor:
Friedrich Spiecker
By [signature] Atty.

May 14, 1957 F. SPIECKER 2,792,453
AUTOMATIC TELEPHONE SYSTEM OF THE RELAY TYPE
Filed Oct. 25, 1952 7 Sheets-Sheet 2
Fig. 2 part I
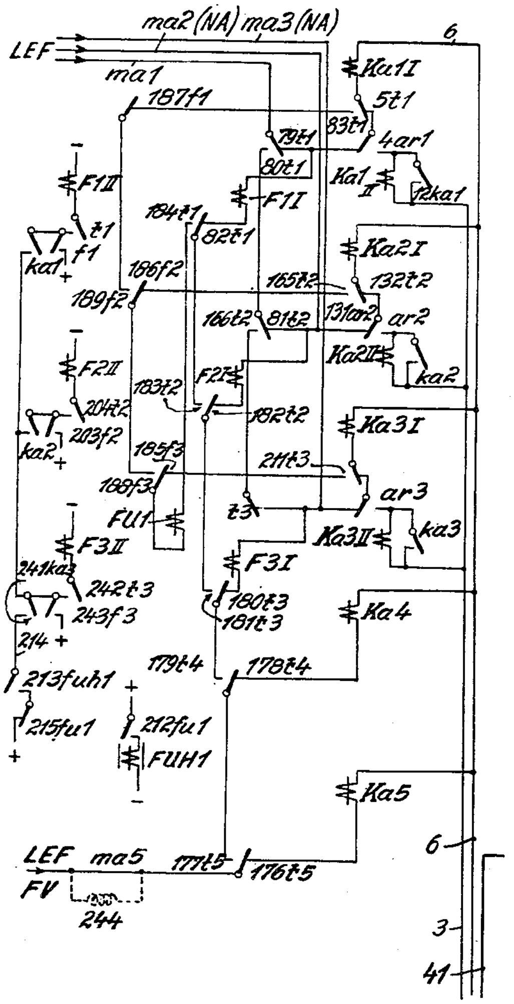
Inventor:
Friedrich Spiecker.
By. [signature] Atty.

May 14, 1957 F. SPIECKER 2,792,453
AUTOMATIC TELEPHONE SYSTEM OF THE RELAY TYPE
Filed Oct. 25, 1952 7 Sheets-Sheet 3
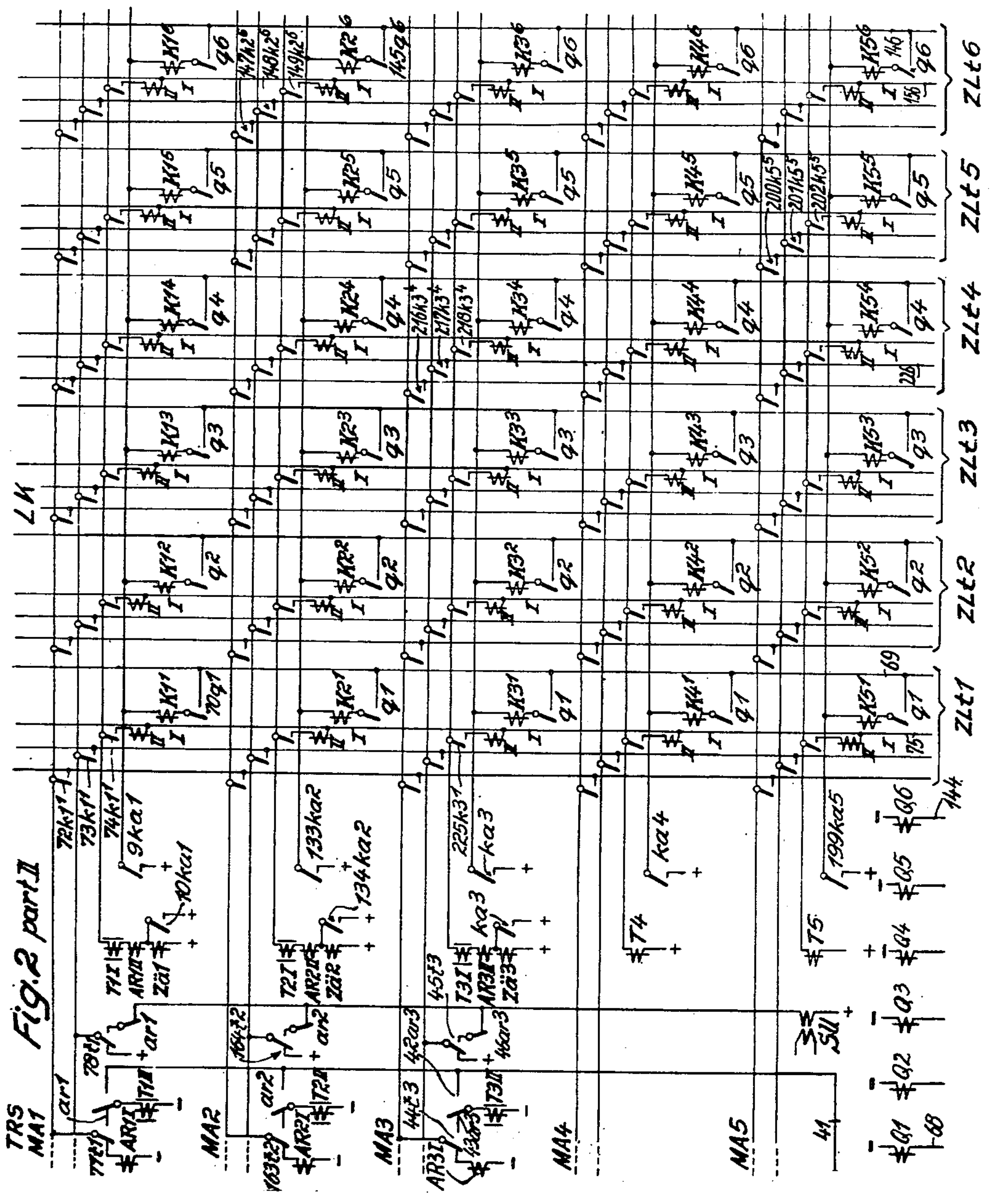
Fig. 2 part II
Inventor:
Friedrich Spiecker.
By [signature] Atty.

AUTOMATIC TELEPHONE SYSTEM OF THE RELAY TYPE

Filed Oct. 25, 1952 7 Sheets-Sheet 4

Inventor:
Friedrich Spiecker.
By [signature] Atty.

AUTOMATIC TELEPHONE SYSTEM OF THE RELAY TYPE

Filed Oct. 25, 1952 7 Sheets-Sheet 5

Inventor:
Friedrich Spiecker.
By. [signature] Atty.

May 14, 1957 F. SPIECKER 2,792,453
AUTOMATIC TELEPHONE SYSTEM OF THE RELAY TYPE
Filed Oct. 25, 1952 7 Sheets-Sheet 6
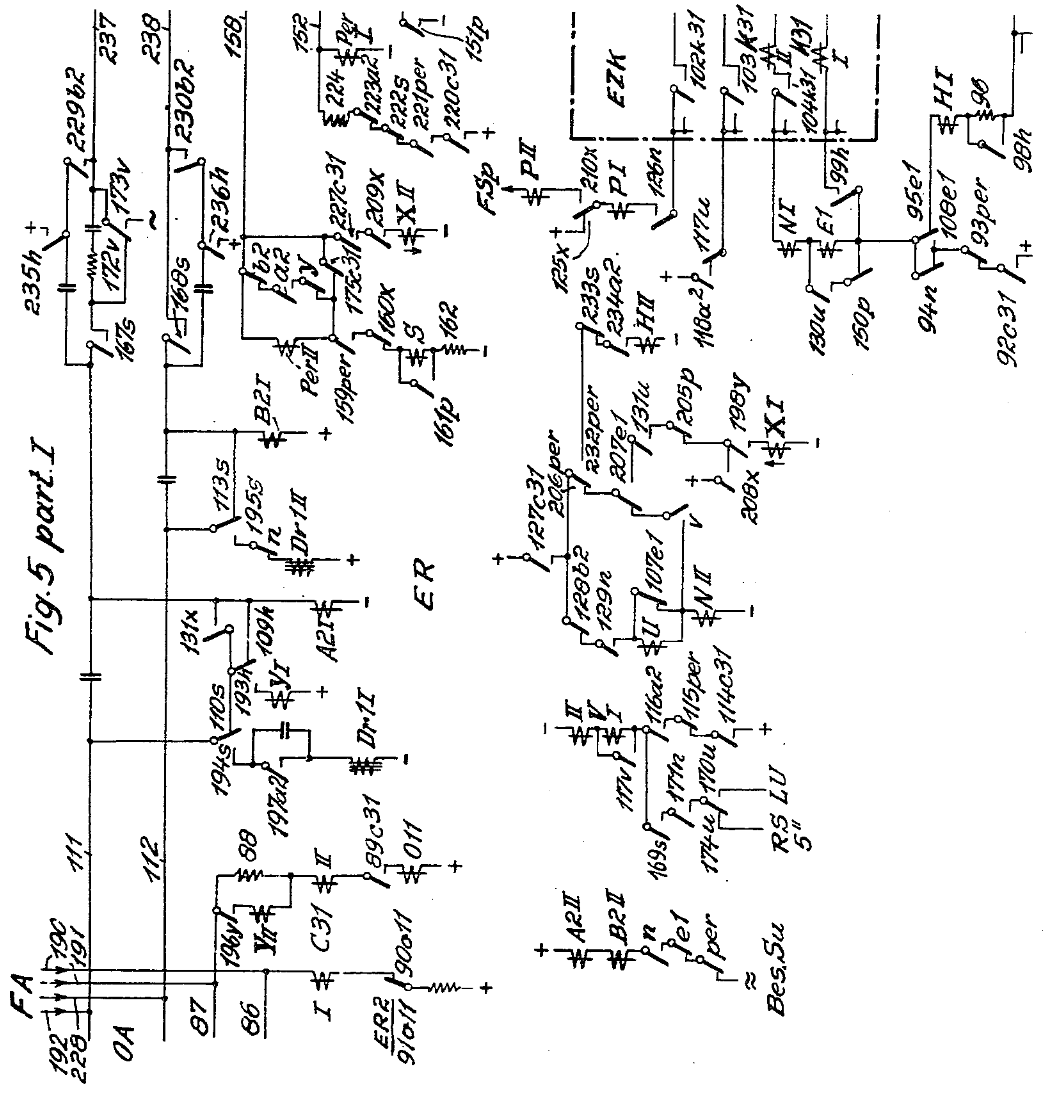
Fig. 5 part I
Inventor.
Friedrich Spiecker.
By [signature] Atty.

May 14, 1957 F. SPIECKER 2,792,453
AUTOMATIC TELEPHONE SYSTEM OF THE RELAY TYPE
Filed Oct. 25, 1952 7 Sheets-Sheet 7
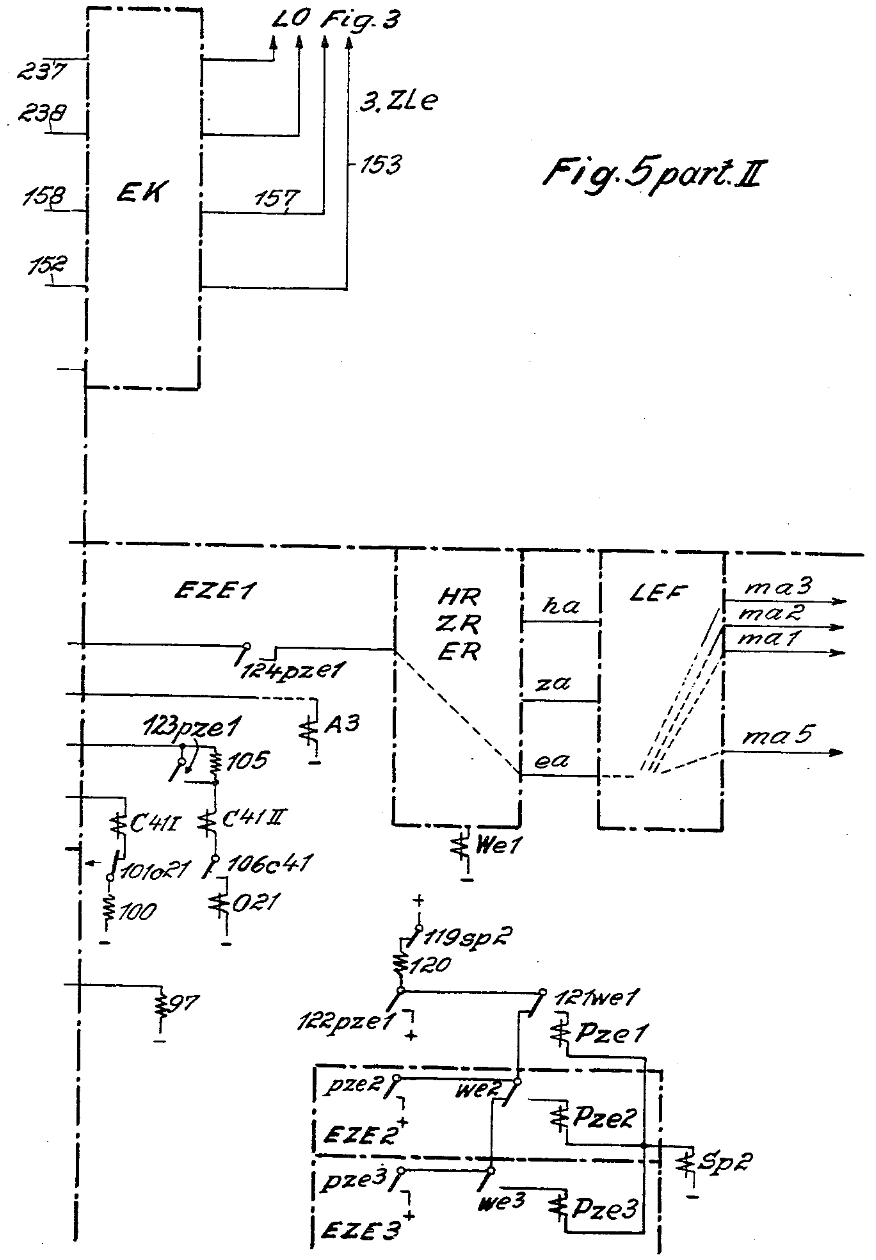
Fig. 5 part II
Inventor:
Friedrich Spiecker
By [signature] Atty.

United States Patent Office 2,792,453

Patented May 14, 1957

2,792,453

AUTOMATIC TELEPHONE SYSTEM OF THE RELAY TYPE

Friedrich Spiecker, Berlin-Charlottenburg, Germany, assignor to Siemens & Halske Aktiengesellschaft, Munich, Germany, a corporation of Germany Application October 25, 1952, Serial No. 316,887

Claims priority, application Germany December 27, 1949

9 Claims. (Cl. 179—27)

This invention relates to telephone systems, and is particularly concerned with an automatic telephone system of the relay type.

Preference calls, for example, toll calls, to private branch exchanges are in automatic telephone systems completed over private branch exchange lines occupied by ordinary, for example, local, calls if there are no idle lines to the private branch exchange available. The line seized for a preference call is busied against seizure from other switches at the connector or at the last switch of the talking path.

The object of the invention is to busy a private branch exchange line in a relay system, which has been seized for a preference call, against seizure for another preference call. The purpose is to avoid any even temporary disturbance of a preference call, which ordinarily is unavoidable, for example, due to the switching in of the toll operator attempting to complete a call.

The foregoing object is accomplished by the provision of switching devices for respectively extending to the lines of a private branch exchange local calls and toll calls, said switching devices comprising a marker and a toll call marking conductor extending therefrom and leading to said private branch exchange, means in said marker for connecting a signal to said toll call marking conductor at a time when a toll call is extended to any of said lines, a locking relay for each of said lines, circuit means including said marker conductor for energizing the locking relay associated with a line to which a toll call is extended by said switching devices, and circuit means controlled by the corresponding locking relay for locking the associated line against seizure for a toll call subsequently extended to said private branch exchange.

The invention requires, for the busying of a private branch exchange line taken into use for a preference call, a special relay for each line to the private branch exchange. This is in a relay system considered more advantageous than the use of means for this purpose, which is connected with or part of a switch employed for building up the call. It would be necessary in the latter case to provide for the talking path at least one auxiliary test conductor extending between the battery feed and the private branch exchange line. The coupling relay would have to be provided with at least one additional contact set. The result would be additional expenditures for expensive coupling relays. Difficulties would also arise in the circuits required for readying for the preference calls the private branch exchange lines which at any time remain available therefor.

Figure 1:
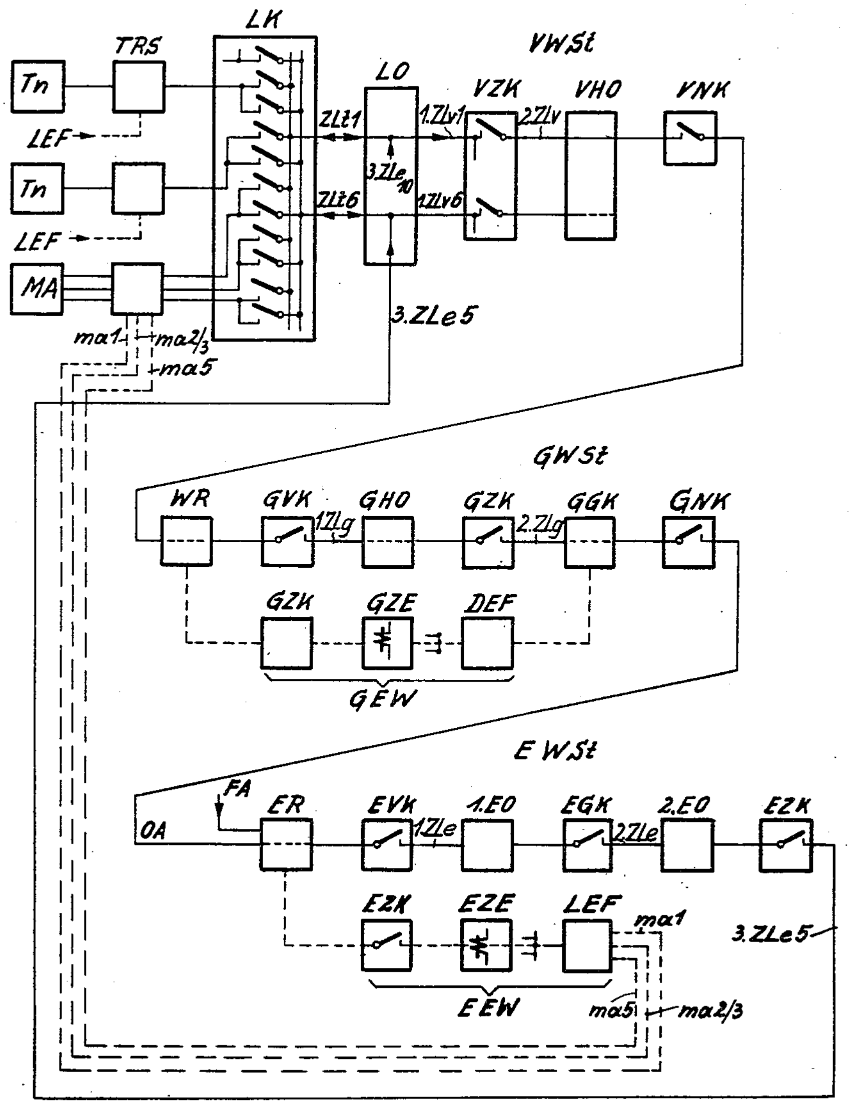
Figure 3:
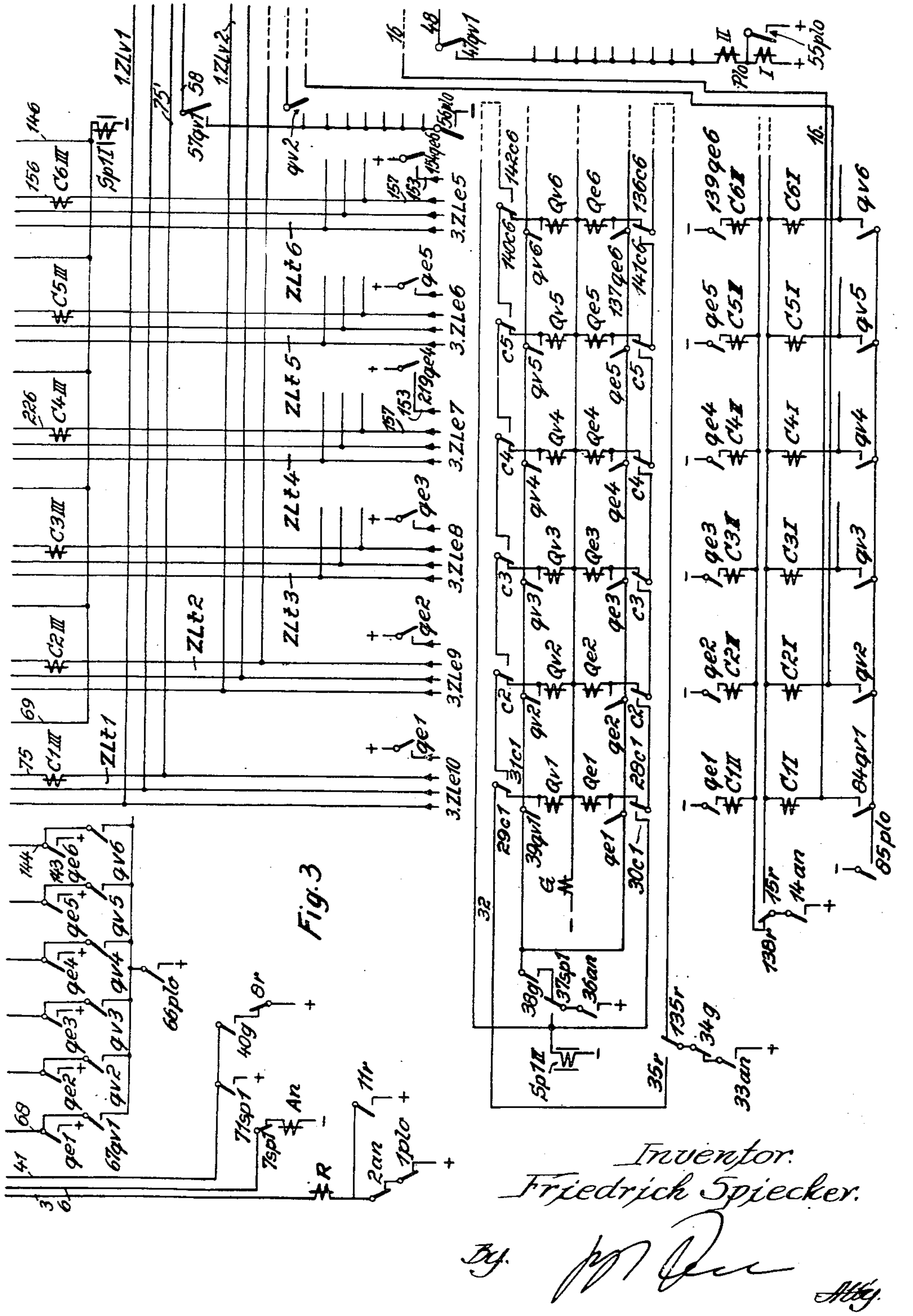
Figures 4, 6:
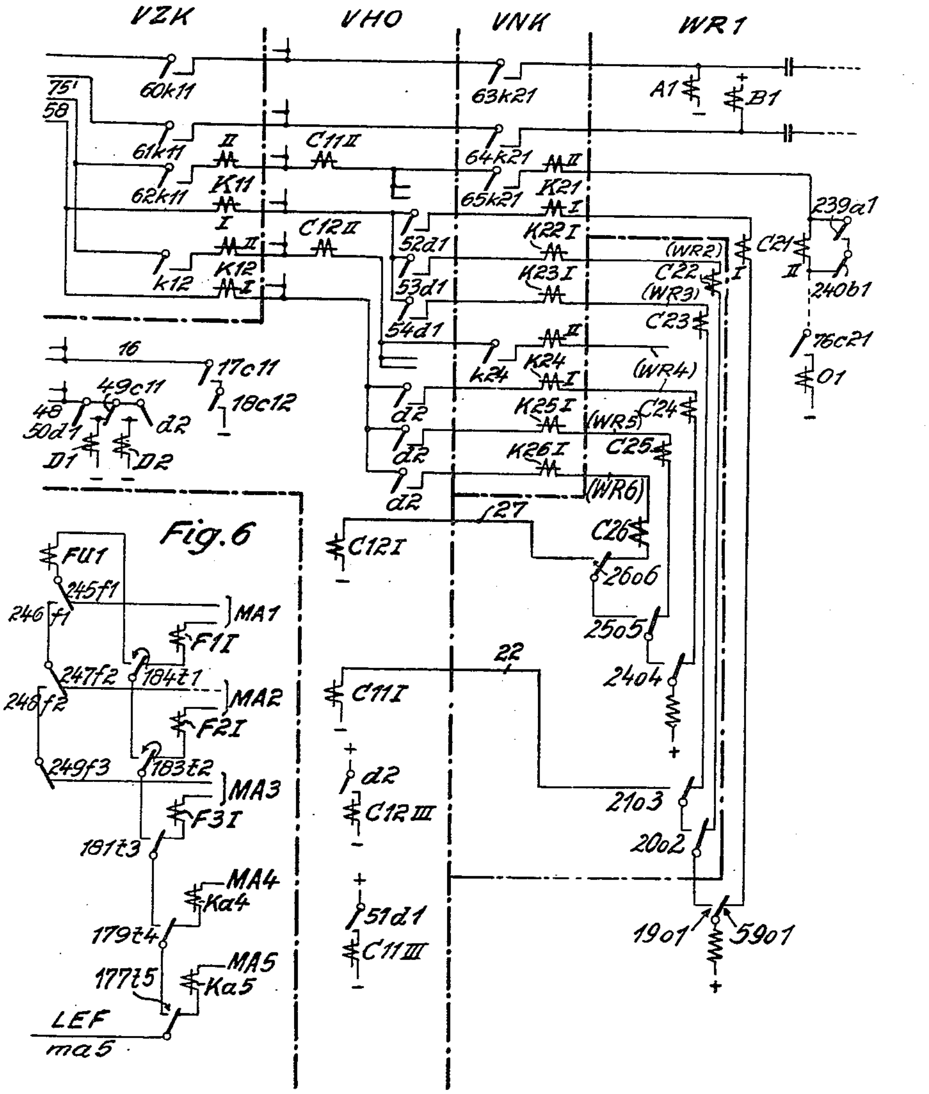

The objects outlined above and other objects and features will appear from the description which will presently be rendered with reference to the accompanying drawings showing examples of the invention in connection with a system which provides for local calls and for toll calls. In these drawings, Fig. 1 is a block diagram of a 100,000-line system;

Fig. 2 shows five private branch exchange lines MA to a private branch exchange, two of which are to be used exclusively for incoming preference calls, and a line coupler LK over which these lines MA are to be connected with two-way intermediate lines ZL*t*;

Fig. 3 indicates an allotter LO for readying or making available idle intermediate lines in outgoing and incoming traffic;

Fig. 4 indicates other couplers of the preselection stage VZK and VNK, an auxiliary preselection allotter VHO and some relays of a relay set WR1 of the group selection stage;

Fig. 5 shows a relay set ER of the terminal selection stage used for local and also for toll calls, indicating by a few relays the switching devices of the final number selection, namely, the coupler EZK, the register EZE1 which contains the number relays HR, ZR, ER, as well as the marker LEF. Details of the couplers EK of the terminal selection stage are omitted; and Fig. 6 shows an alternative form of a chain circuit for use, in place of the chain circuit of Fig. 2, for making available for toll calls locally busy private branch exchange lines.

*The system shown in Fig. 1*

Fig. 1 shows a 100,000-line relay system provided for five-digit subscriber numbers. All connections are built up in three stages, namely, the preselection stage VWS*t*, the group selection stage GWS*t* and the terminal or line selection stage EWS*t*. The lines are subdivided in groups, each group having, e. g., 50 lines. The figure shows in such a group two single subscribers' lines T*n* and one group of P. B. X lines to a private branch exchange MA having a desired number of private branch exchange lines, three of which are indicated in the drawing. As will presently appear in detail, it is assumed in the example shown that the private branch exchange has five private branch exchange lines, two of which are to be used exclusively for incoming toll calls.

The line coupler LK is the first coupler of the preselection stage in outgoing calls and at the same time the last coupler of the terminal selection stage in incoming calls. This coupler serves for connecting a calling line with an intermediate line ZLT which is made available by the allotter LO. Each two-way intermediate line ZL*t* is forked or branched in the allotter, one branch serving as the first intermediate line of the preselection stage (1.ZL*v*) and the other branch seving as the last intermediate line of the terminal selection stage, e. g., as the third intermediate terminal line (3.ZL*e*).

The intermediate line which is taken into use, e. g., ZL*t*1/1.L*v*1, is coupled with an idle relay set WR of the group selector stage over the coupler VZK and VNK and an idle intermediate line (2.ZL*v*) of the next stage which is made available by the auxiliary allotter VHO.

After the calling line has been extended to the relay set WR, an idle register GZE will be connected to the latter over a coupler GZK of the group-setting path GEW. The register contains the number relay groups which are to be affected by the dial impulse series, e. g., by two digits. After these two digits are received, a marker signal is given by the decade marker DEF, of which only one is provided, for the building up of the talking path in the group selection stage. Marker signals are at the same time effective in the relay set WR and in the group coupler GGK, which cause connection of the relay set WR (which has been seized by the calling line) with an idle final relay set ER of the final selection stage over the couplers GVK, GZK and GNK. An idle first intermediate line 1.ZL*g*, which extends between the couplers GVK and GZK, is made available by the allotter GHO, while an idle second intermediate line 2.ZL*g*, extending between the couplers GZK and GGK, is made available by the allotter which is combined with the group coupler. The group-setting path GEW is released after the calling line has been extended to the final relay set ER, as described.

To the final relay set ER, which has been seized over the incoming trunk OA, is connected an idle register EZE over the coupler EZK. This register contains the number relay groups which are controlled by the impulse series which correspond to the final three digits of the called number. After the register EZE has received the corresponding impulse series, the marker LEF (of which only one is provided in the corresponding switch group) will give a marker signal to the selected line over the associated control or marker conductor.

Only connections to a private branch exchange need be considered within the scope of the invention. Accordingly, the selected private branch exchange is controlled over the control or marker conductor *ma*1. The marker signal is received in the subscribers' relay set of the first idle private branch exchange line and also in the allotter LO. The marker conductor *ma*1 is for the selection of an idle private branch exchange line of number always connected with the inlet of an idle private branch exchange line, over contacts of relays which are energized during existing calls.

The allotter LO makes the intermediate line available, which is to be used for the incoming call. If all the intermediate lines ZL*t* are two-way lines—in which case they may be used for incoming and for outgoing calls—the selection among these intermediate lines will take place in one order for incoming calls and in reverse order for outgoing calls. For example, if there are ten intermediate lines available for a group of subscribers' lines, these lines will be taken into use for incoming calls in the order 1 . . . 10 and for outgoing calls in reverse order 10 . . . 1.

If it is now assumed that the intermediate line ZL*t*6 is made available, such line will be coupled with the private branch exchange line over the line coupler LK and with the branch line 3.ZL*e*5 which is to be used for the incoming call to be completed, the latter connection involving an idle line 2.ZL*e* made available by the allotter 2.EO and the coupler EZK. The line 2.ZL*e* will be connected with an idle intermediate line 1.ZL*e* over the group coupler EGK. The last-noted line 1.ZL*e* will be connected over the coupler EVK with the relay set ER seized by the calling line.

Some lines of the group of private branch exchange lines to the private branch exchange may be selected just like a line of a single-line subscriber. This is necessary for the purpose of reaching at certain times, for example during off hours (night service), desired extensions of an establishment, which are connected to certain lines of the private branch exchange line group. Such night service lines are not reached over the control or marker conductor *ma*1, but over the marker conductor *ma*2 or *ma*3 responsive to the dialling of another call number. If a called night service line is found busy, the marker or start conductor will not be switched to another private branch exchange line. The calling subscriber receives in such a case busy tone, even if the other private branch exchange lines should be idle.

Preference calls, mainly toll calls, may be built up over the same switching devices as ordinary local calls. In the example of the invention shown in the drawings, the toll calls are built up over the switching means of the final selection stage EWS*t* (Fig. 1), which is also used for local calls. The toll exchange reaches the final relay set ER over the trunk FA. The final relay set is in such a case automatically affected so as to fulfill requirements that occur only in connection with toll calls.

Private branch exchanges frequently have a special number that is to be used only for toll calls. Such provision is required especially in a case where several of the P. B. X lines are reserved for toll calls only. The lines which ordinarily serve for local calls are used as a makeshift for toll calls only if the special toll lines are busy. The lines which serve for toll calls, on the other hand, are never used as a makeshift for completing local calls. The private branch exchange lines are in toll traffic reached over the control or marker conductor *ma*5. This conductor is by a chain circuit always connected with an idle P. B. X line for toll calls and, if all such lines are busy, with an idle line serving ordinarily for local calls. If all private branch exchange lines should be busy, the control or marker conductor *ma*5 will be connected over a second contact chain formed by toll-busy relays, with a line involved in a local call. Responsive to the start or marker signal given over the marker conductor, there will be completed a talking path from the final relay set ER to the line engaged in a local call. The toll operator is connected through, informs the talking local parties that a toll call is waiting and, if the parties do not hang up, she may sever the local call and switch the toll call through.

*Connection of a calling private branch exchange line with a relay set in the group selection stage: Figs. 2, 3 and 4*

Fig. 2 should be placed above Fig. 3 with identically marked conductors aligned, and Fig. 4 should be placed at the right of Fig. 3 with corresponding conductors in alignment.

It shall be assumed that a call is made over the private branch exchange line MA1 (see Fig. 2). The line relay AR1 energizes and places its contacts in operated position. A start signal is given to the allotter LO (Fig. 3) and the coupling start relay KA1 (upper left of Fig. 2) energizes over the circuit 1. from ground (left hand, Fig. 3), contacts 1*plo*, 2*an*, relay R, conductor 3 to Fig. 2, coupling start relay K*a*1 (winding II), contacts 4*ar*1, 5*t*1, winding I of relay K*a*1, conductor 6 to Fig. 3, contact 7*sp*1, winding of relay A*n* to battery.

Relay K*a*1 operates its contact 9*ka*1 to place ground on the conductor of the P. B. X line to which are connected the windings I of the coupling relays $K1^1$, $K1^2$ . . . $K1^6$, thereby giving a coupling marker signal. At contact 10*ka*1 is prepared a holding circuit which will become effective after the private branch exchange line MA1 has been connected with an idle relay set. Contact 12*ka*1 of the relay K*a*1 is also closed and short-circuits the high-resistance winding K*a*1II thereof. The short-circuiting of the high-resistance winding prevents actuation of the coupling start relay of another calling line until such a time when the line MA1 is connected to an idle relay set, because only the low-resistance winding II of the relay K*a*1 will then be in parallel with the two corresponding windings I and II of the other coupling start relay, thus preventing sufficient current from flowing for the energization thereof. Each coupling start relay therefore also operates as a test and busy relay to prevent simultaneous connection of several calling lines to an intermediate line.

The relay A*n* (left hand, Fig. 3) in the allotter, which has been energized in circuit No. 1, traced above, is the call-receipt relay. It initiates the selection of an idle intermediate line. The energization of the relay R signifies that the connection to be built up is for an outgoing call. It closes its contact 11*r*, thereby connecting itself in a holding circuit independent of contact 2*an*. As already mentioned, each intermediate line ZL*t* forks in the allotter, to form two branches. One of these branches constitutes a first intermediate line of the preselection stage (1.ZL*tv*) which has over two serially disposed couplers VZK and VNK access to six relay sets WR of the group selector stage. If the intermediate line ZL*t*1 (and therewith 1.ZL*v*) is idle—but if all relay sets WR1—WR6 accessible thereto are busy—a chain circuit will come into operation for switching the contact chain which controls the coupling start relays for outgoing calls.

Relay C1 will in such case energize over its winding I (C1I, lower left of Fig. 3) over a circuit 2. from ground, contacts 14*an*, 15*r*, winding C1I, conductor 16 to Fig. 4, contacts 17*c*11 and 18*c*12 to battery.

The contacts 17*c*11 and 18*c*12 involved in the above circuit are closed because the corresponding relays C11 and C12 in the allotter VHO (Fig. 4) are energized in the following circuits:

3. from battery, winding C11I of relay C11 (left hand of Fig. 4), conductor 22, contacts 21*o*3, 20*o*2, 19*o*1 of the locking or busy relays of the relay sets WR1—WR3 to ground; and 4. from battery, winding C12I of relay C12, conductor 27, contacts 26*o*0, 25*o*5, 24*o*4, resistance to ground.

Relay C1, upon energizing, opens its contacts 28*c*1 and 29*c*1 and closes its contacts 30*c*1 and 31*c*1, thereby switching the conductor 32 through to the coupling start relay Q*v*2 of the intermediate line ZL*t*2 (1.ZL*v*2). If the relay sets accessible to this intermediate line are also busy, the relay C2 will operate in a circuit corresponding to the one traced in No. 2, and the conductor 32 will be switched through to the Q*v* relay of the next intermediate line. The operation will be similar in the case of each unavailable intermediate line.

It shall be assumed, however, that the relay set WR1 (Fig. 4) is idle. The contact 12*c*11 therefore is open. The previously traced circuit No. 2 will not be completed. The relay Q*v*1 therefore will energize in a circuit 5. from ground, contacts 33*an*, 34*g*, 35*r*, conductor 32, contact 29*c*1, winding of relay Q*v*1 and winding of relay G to battery.

The relays G and Q*v*1 will stay energized in a holding circuit over contact 39*qv*1 operated by relay Q*v*1 and contact 38*g* operated by relay G, which extends 6. from battery, winding of relay G, winding of relay Q*v*1, contact 39*qv*1 and contacts 38*g*, 37*sp*, 36*an* to ground.

The previously traced circuit No. 5 is opened at contact 34*g*.

A circuit is closed at contact 47*qv*1 for the testing relay P*lo* (lower right of Fig. 3) which extends 7. from ground, windings I and II of relay P*lo*, contact 47*qv*1, conductor 48 to Fig. 4, contact 49*c*1, winding of relay D1 to battery.

Relay D1 energizes and connects itself over its contact 50*d*1 to the conductor 48, also closing its contact 51*d*1 (bottom of Fig. 4), to complete an energizing circuit for relay C11 over the winding C11 thereof. Relay D1 also closes its contacts 52*d*1, 53*d*1 and 54*d*1 in the allotter VHO, thereby switching the conductor 58 (and relay K11) through to the relays K21, K22, K23. The relay P*lo* (lower right of Fig. 3) closes its contact 55*plo*, thereby short-circuiting its high-resistance winding I to prevent energization of a corresponding test relay in another allotter LO during the time required for effecting the coupling operation.

The connection of the relay set WR1 to the intermediate line 1.ZL*v*1 is accomplished by the energization of the relays K11 and K21 (Fig. 4) over a circuit 8. from battery, contact 56*plo* of the energized test relay P*lo*, contact 57*qv*1, conductor 58, winding I of the coupling relay K11, contact 52*d*1, winding I of the coupling relay K21, winding I of relay C21, contact 59*o*1 and resistor to ground.

Contacts 60*k*11, 61*k*11, 62*k*11 of relay K11 and contacts 63*k*21, 64*k*21, 65*k*21 (see VZK and VNK in Fig. 4) are closed by the energization of the relays K11 and K21 to switch the intermediate line 1.ZL*v*1 through to the relay set WR1.

Relay C1 will energize over its winding I (C1I, bottom of Fig. 3) in a circuit 9. from ground, contacts 14*an*, 15*r*, winding C1I and contacts 84*qv*1, 85*plo* to battery.

The relay Q1 (bottom of Fig. 2), which causes the coupling of the intermediate line 1.ZL*v*1 (ZL*t*1) with the calling line, now operates in a circuit 10. from battery, winding of relay Q1, conductor 68 to Fig. 3 and contacts 67*qv*1 and 66*plo* to ground.

Relay Q1, upon operating, connects to the conductor 69 the energizing windings of those coupling relays that can connect the calling lines with the intermediate line ZL*t*1. Only the coupling relay K1¹ for the line MA1 can, however, energize because the start or marker condition has been produced only for this line by the energization of relay K*a*1, the energization circuit for K1¹ extending 11. from ground, contact 9*ka*1, winding I of K1¹, contact 70*q*1, conductor 69 to Fig. 3, winding I of the busy relay S*p*1 to battery.

Relay S*p*1 operates and closes its contacts 71*sp* (left in Fig. 3). Relay K1¹ closes its coupling contact 72*k*1¹, 73*k*1¹, 74*k*1¹ (left and above winding I of relay K1¹ at the top of Fig. 2). A holding circuit is now completed which extends 12. from ground, contact 10*ka*1, winding II of relay AR1, winding I of relay T1, contact 74*k*1¹, winding II of relay K1¹, conductor 75 to Fig. 3, winding III of relay C1, conductor 75' to Fig. 4, contact 62*k*11, winding II of relay K11 (VZK in Fig. 4), winding II of relay C11 (VHO, Fig. 4), contact 65*k*21 (VNK, Fig. 4), winding II of relay K21, winding II of relay C21 . . . contact 76*c*21 and winding of relay O1 to battery.

Relay T1 opens its contacts 77*t*1 and 78*t*1, thus disconnecting the line conductors of the calling line MA1 (line loop) from the line relay winding AR1I, and by opening its contact 5*t*1 interrupts circuit No. 1, thus causing deenergization of the coupling start relay K*a*1. The latter relay opens its contact 10*ka*1, thus removing the short circuit from the winding of the meter Z*a*1 and connecting such meter in circuit No. 12 in series with the relay winding T1I. The meter Z*a*1 does not energize for the time being. Relays A*n* and R (left in Fig. 3) in the allotter deenergize, followed by the deenergization of relays Q*v*1, P*lo*1, Q1. Relay C1 remains operated in its holding circuit.

Relay T1 has opened its contact 79*t*1 (upper left in Fig. 2) and has thereby disconnected the normal or start conductor *ma*1 coming from the marker LEF, from the inlet to the line MA1 while connecting it at contact 80*t*1 to the inlet of the next line MA2 to the private branch exchange. If this line is idle, the normal or start conductor *ma*1 will now be connected over contact 81*t*2 to the winding I of relay K*a*2 of this next line. The line MA1 is, by opening of contact 82*t*1 (top of Fig. 2) marked busy in the start circuit for toll calls, since the special inlet from the start or marker conductor *ma*5 (lower left in Fig. 2), which is used only when the subscriber's line is idle, is thereby interrupted. Closure of contact 83*t*1 connects the winding I of the coupling start relay K*a*1 to a second contact chain over which the line MA1 is accessible to the start conductor *ma*5 for toll calls, provided that there is no idle line available to the private branch exchange at the time of a toll call.

The relay O1 in the relay set WR1 (Fig. 4) has opened its contact 59*o*1, thereby busying the relay set against seizure by other calls. The calling subscriber now dials the number of the wanted party and is connected thereto.

The above described closure of contact 71*sp*1 (upper left of Fig. 3), responsive to the energization of relay S*p*1 (upper right of Fig. 3), concludes the start of a call in the case of each line remaining in calling position up to the conclusion of all switching operations coincident with the connection of the calling line MA1 with an idle relay set.

For example, if a call is initiated at the line MA3, relay AR3 will energize and close its contact 42*ar*3, thus completing a circuit for the actuation of relay T3 over its winding II which extends to ground on the conductor 41. The bridge over the line loop is disconnected by the actuation of the contacts 44*t*3 and 45*t*3, and the relay T3, after closure of the contact 43*ar*3, is connected in a holding circuit 13. from battery, winding II of relay T3, contacts 43*ar*3, 44*t*3, calling subscriber's loop, contacts 45*t*3, 46*ar*3 and induction coil S*u* to ground.

Busy tone is connected to the primary winding of the induction coil S*u* and the calling party is thus informed that the wanted call cannot be completed. Relay T3 deenergizes when the calling party hangs up.

*Call from a local subscriber to the private branch exchange: Figs. 5, 2 and 3*

The calling local subscriber is in this case connected with the final relay set ER shown in Fig. 5, which was seized over the incoming line OA (top left of Fig. 5) provided for local traffic. Relay C31 energizes over the coupling circuit extending over the conductor 86. The holding circuit extends 14. from battery in the relay set WR of the group selection stage involved in the seizure of the final relay set ER of Fig. 5, coupling relay of the group selection stage, conductor 87, resistance 88, winding II of relay C31, contact 89*c*31 and winding of relay O11 to ground.

Relay O11 opens its contact 90*o*11 and closes its contact 91*v*11, thus busying final selector ER.

An idle final register EZE1 is now connected, and relay H energizes over its winding HI (bottom center of Fig. 5) in a circuit 15. from ground, contacts 92*c*31, 93*per*, 94*n*, 95*e*1, winding HI, and resistors 96 and 97 to battery.

Resistor 96 is short-circuited by contact 98*h* of relay H responsive to energization of relay H. Coupling relay K31 (EZK in Fig. 5), which causes the coupling with an idle final register EZE1 that is to be seized first, energizes now in series with relay C41 over a circuit 16. from ground, contacts 92*c*31, 93*per*, 94*n*, 99*h*, winding I of relay K31, winding I of relay C41, contact 101*o*21 and resistor 100 to battery.

Relay K31 closes its contacts 102*k*31, 103*k*31 and 104*kw*1, completing over contact 104*k*31 a holding circuit 17. from ground, contacts 92*c*31, 93*per*, 94*n*, winding of relay E1, winding I of relay N, contact 104*k*31, winding II of relay K31, resistor 105, winding II of relay C41, contact 106*c*41 and winding of relay O21 to battery.

Relay N does not energize in this circuit, due to the high resistance of resistor 105. Contact 107*e*1 is opened by relay E1 and removes the short circuit from relay U. Contact 95*e*1 opens to interrupt circuit No. 15. Relay H accordingly deenergizes and opens circuit No. 16. Contact 108*e*1 disposed in parallel with contact 94*n* is closed by actuation of relay E1. When the calling local subscriber dials the last three digits of the called number, the corresponding series of impulses will be received by relay A2 in a circuit 18. from ground in the relay set of the group selection stage, conductor 111, contacts 110*s*, 109*h*, winding I of relay A2 to battery.

Relay V energizes responsive to the first actuation of relay A2 in a circuit 19. from ground, contacts 114*c*31, 115*per*, 116*a*2 and windings I and II of relay V in series to battery.

Relay V short-circuits its winding I by closing its contact 117*v*, thereby becoming slow to release and thus remaining energized during the receipt of each impulse series. The series of impulses are transmitted to relay A3 of the seized final register EZE1 over a circuit 20. from ground, contacts 118*a*2, 117*u*, 103*k*31, winding of relay A3 to battery.

The selection of the private branch exchange number is completed after receipt of three series of impulses. The number or digit relay groups HR, ZR and ER (hundreds, tens and units relays) are respectively affected by the three digits, and as a result thereof the marker conductor

*ma*1 in the marker LEF is marked as the one over which the start or marker impulse is to be given for the building up of the desired call. The selection-terminated relay W*e*1 is energized as a criterion that the selection has been completed. If no start marker signal is at this time present at another register for the building up of a call, relay P*z*1 will energize in a circuit 21. from ground, contact 119*sp*2, resistance 120, contact 121*we*1, winding of relay P*ze*1 and relay S*p*2 to battery.

Relay S*p*2 will energize only after contact 122*pz*1 has short-circuited resistor 120. Upon energizing, relay S*p*2 opens its contact 119*sp*2. Contact 124*pz*1 will be closed. Resistance 105 will be short-circuited by contact 123*pz*1. Relay N, which is in circuit No. 17, will now energize and connect itself in a holding circuit 22. from ground, contacts 127*c*31, 128*b*2, 129*n*, relay U, winding II of relay N to battery.

Relay U operates contact 130*u* to short-circuit relay E1. Contact 131*u* is also closed, but the circuit controlled thereby remains without effect in case of local calls. A testing circuit now becomes effective for giving the start marker signal to complete the call to the calling subscriber's relay set. The called party is a private branch exchange, and the start marker signal will therefore affect the first idle private branch exchange line. If it is assumed that the line MA1 is busy and line MA2 idle, the test circuit will extend 23. from ground, contact 125*x*, winding I of relay P, contacts 126*n*, 102*k*31, 124*pze*1, contacts closed by the number relay groups, units conductor *ea*, contacts in the marker LEF, start marker conductor *ma*1 to Fig. 2, contacts 80*t*1, 81*t*1, 131*ar*2, 132*t*2, winding I of relay K*a*2, conductor 6 to Fig. 3, contact 7*sp*1 and winding of relay A*n* to battery.

Relays P, K*a*2 and A*n* energize. Relay K*a*2 closes its contact 133*k*2, producing the coupling marker signal by connecting ground to all coupling relays $K2^1$, $K2^2$, etc., which are associated with line MA2. Contact 134*ka*2 prepares the holding circuit.

Only relay A*n* is operated in allotter LO, marking the direction of the incoming call to be built up. No coupling or start marker signal can become effective at any other line of the called party during the coupling of line MA2 with the final relay set ER, because ground is disconnected from relay R at contact 2*an* of energized relay A*n*.

All the intermediate lines ZL*t*, which are made available by the allotter LO, are two-way lines. They are seized in incoming calls in a sequence reverse from the sequence of seizure in outgoing calls. The branches leading to the final selection stage are the intermediate line branches 3.ZL*e*.

It shall be assumed now that the intermediate lines ZL*t*7–10 and therewith 3.ZL*e*1–4 are busy. The intermediate line ZL*t*6 serving as 3.ZL*e*5 is prepared by relay Q*e*6 (bottom of Fig. 2) which initiates the coupling in a circuit 24. from ground, contact 33*an* (bottom left of Fig. 3), contacts 34*g*, 135*r* . . . 136*c*6, winding of relay Q*e*, winding of relay G to battery.

Relays G and Q*e*6 operate their contact 38*g* and 137*qe*6, thereby closing a holding circuit for their own windings, which extends 25. from ground, contacts 36*an*, 37*sp*1, 38*g*, 137*qe*6, winding of relay Q*e*6, winding of relay G to battery.

Relay G operates its contact 34*g* thereby interrupting originally energized circuit No. 24 for itself and for Q*e*6. Contact 40*g* is also operated by relay G, closing a point in the ground connection to conductor 41 (top left of Fig. 3). Relay Q*e*6 has operated its contact 139*qe*6 to close a circuit for energizing relay C6 (lower right of Fig. 3) in a circuit 26. from battery, contact 139*qe*6, winding II of relay C6, contacts 138*r*, 14*an* to ground.

Relay C6 opens its contacts 136*c*6, 140*c*6 and closes its contacts 141*c*6, 142*c*6. The two contact chains, which control the energizing circuits for relays Q*e* and Q*v*, are now switched through to the corresponding Q*e* and Q*v* relays of the next intermediate line, i. e., to the relays Q*e*5 and Q*v*7 (not shown). Relay Q6 (bottom of Fig. 2) energizes in a circuit 27. from battery, relay Q6, conductor 144 to Fig. 3, contact 143*qe*6 to ground.

The energizing circuits of all coupling relays, which couple the subscribers' lines with the intermediate line ZL*t*6, are prepared. Since there is a coupling marker signal on the line MA2 (ground on a control conductor of MA2 over closed contact 133*ka*2) and since relay Q6 has operated and closed its contact 145*q*6 (right in Fig. 2), the relay K2[6] will energize in a circuit 28. from ground, contact 133*ka*2, control conductor of line MA2, winding I of relay K2[6], contact 145*q*6, conductor 146 to Fig. 3, winding I of relay S*p*1 to battery.

The coupling is effected by closure of contacts 147*k*2[6], 148*k*2[6], 149*k*2[6].

In the final relay set (Fig. 5) relay P operates and opens its contact 150*p*, thereby removing the short circuit from the winding of relay E1. At its contact 151*p* relay P closes a point in a circuit for marking the completion of the call. Relay P*er* now operates in a circuit 29. from battery, winding I of relay P*er*, conductor 152, energizing winding of the coupling relays in the final selector stage (EK in Fig. 5), conductor 153 to Fig. 3, 3.ZL*e*5, contact 154*qe*6 to ground.

A holding circuit is now completed which extends:

30. from ground (Fig. 2), contact 134*ka*2, winding II of relay AR2, winding I of relay T2, contact 149*ka*6, winding II of relay K2[6], conductor 156 to Fig. 3, winding III of relay C6, conductor 157 to Fig. 5, holding winding of the coupling relays in the final selection stage, conductor 158, winding II of relay P*er*, contacts 159*per*, 160*x*, 161*p*, resistor 162 to battery.

Relay P*er* energizes and actuates its contact 93*per*, thereby interrupting circuit No. 17 to cause deenergization of relay E1 and also deenergization of coupling relay K31. The latter relay releases its contact 102*k*31 to cause deenergization of relay P which was actuated in circuit No. 23. Relay U is short-circuited by contact 107*e*1, responsive to deenergization of relay E1. Relay P opens its contact 161*p*, thereby removing the short circuit around the winding of relay S. The latter relay is now connected in circuit No. 3, and energizes.

Relay T2 of the called private branch exchange line MA2, upon energizing in circuit No. 30, opens its contacts 163*t*2 and 164*t*2, thereby disconnecting relay AR2 from this P. B. X line. At contact 132*t*2, relay T2 opens circuit No. 23 and at contact 165*t*2 it connects the coupling start relay K*a*2 to the contact chain over which the locally busy private branch exchange line can be seized for a local call. By opening contact 81*t*2 and closing contact 166*t*2, relay T2 switches the marker or start conductor *ma*1 through to P. B. X line MA3.

As noted before, relay S in the final relay set ER actuates in circuit No. 30, after the shunt around its winding is removed by the opening of contact 161*p*, and switches the line conductors through at its contacts 167*s* and 168*s*. The choke D*r*1 is connected to the calling side of the line conductors 111 and 112 at contacts 194*s* and 195*s*. Winding I of the choke will be connected to conductor 111 over a capacitor until such a time when relay A2 energizes in the battery-feed circuit to the called party. This capacitor is thereupon bridged by a contact 197*a*2 of relay A2. A circuit will be closed over contact 169*s*, which may be traced 31. from ground, slow interrupter LU (lower left in Fig. 5), contacts 170*u*, 171*n*, 169*s* and windings I and II of relay V to battery.

Contact 172*v* is now opened and contact 173*v* is closed, connecting the ringing current source to the upper line conductor 237 extending to the called line. Relay U energizes after a while, due to the shunt placed around its winding by the closure of contact 107*e*1, responsive to deenergization of relay E1, and closes its contact 174*u* to connect relay V to ringing interrupter RS. The latter causes periodic energization of relay V in certain intervals, say five or ten seconds, thereby causing corresponding actuation of contact 172*v* so as to transmit in known manner ringing current to the called line.

When the called line answers, relays A2 and B2 will operate over the party's line loop. Relay B2 operates its contact 128*b*2, thereby interrupting holding circuit No. 22 which extends over winding II of relay N, and this relay thereupon deenergizes.

The release of the connection is initiated by the calling subscriber. The relay set of the group selection stage seized by the calling subscriber is disconnected from the conductor 87. Relays C31 and O11 (left in Fig. 5) deenergize. Winding II of relay Per is short-circuited by the closure of contact 175*c*31, causing Per to deenergize and to open circuit No. 30. Relay AR2 in the called private branch exchange line quickly deenergizes, while relay T2 remains operated for a while. If the called subscriber does not replace his receiver, relay T2 will be held energized over the called line in a circuit corresponding to No. 13, until the called party hangs up.

*Off-hour calls*

Some of the private branch exchange lines may be called in off hours, e. g., after business hours or on Sundays, just like a single line. Such private branch exchange lines are for this purpose suitably switched through at the private branch exchange. Suitable switching provisions are known for this purpose. It shall be assumed that the private branch exchange lines such as MA2 and MA3 are used in this manner. If the line MA2 should be selected over the control conductor *ma*2, the call will be completed in usual manner, provided that line MA2 is idle. If such line is busy, the calling party will receive busy tone, because there will be no further switching of the control conductor *ma*2 to the next private branch exchange line, conductor *ma*2 being connected with the private branch exchange line MA2 between chain contacts 81*t*2 and 131*ar*2.

*Toll calls*

Two special private branch exchange lines MA5 and MA4 are provided for toll calls. If these lines are busy, an idle one of the private branch exchange lines provided for local calls will be taken into use for toll calls. The selection of an idle line for toll calls, and thereafter an idle line for local traffic, takes place over the chain formed by the contacts indicated in Fig. 2 at 176*t*5/177*t*5, 178*t*4/179*t*4, 180*t*3/181*t*3, 182*t*2/183*t*2 and finally contact 82*t*1. If all the private branch exchange lines are busy, i. e., if contacts 175*t*5, 179*t*4, 181*t*3, 183*t*2 and 184*t*1 are closed, the toll call marker conductor *ma*5 will be connected to a second contact chain which is formed by contacts of the toll-busy relays of the private branch exchange lines serving local calls. This contact chain always makes a locally busy private branch exchange line available for toll calls. If it should happen that all private branch exchange lines serving normally for local calls are occupied by toll calls, contacts 185*f*3, 186*f*2, 187*f*1 will be open, and contacts 188*f*3 and 189*f*2 will be closed, preventing completion of a testing circuit over the toll marker conductor *ma*5.

The private branch exchange lines MA4 and MA5 are provided exclusively for incoming toll calls. Call relays such as AR1, AR2 and AR3 are not required for such lines.

It will be assumed now that a toll call is to be extended to the private branch exchange and that the private branch exchange line MA5 is idle and ready to receive the call.

The final relay set ER (Fig. 5) is seized from the toll exchange over the toll trunk FA. Relay C31 will operate in a circuit from conductor 190 and will close its contact 89*c*31 to complete a holding circuit extending over conductor 191. Relay H energizes in a circuit corresponding to circuit No. 15, and relay Y is then actuated over its winding I in a circuit 32. from ground, winding I of relay Y, contacts 193*h*, 110*s*, conductor 111 and over conductor 192 to the toll exchange to battery, which has been temporarily connected to conductor 192 at the toll exchange or at an intervening repeater.

Relay Y closes its contact 196*y*, thereby connecting its winding II in parallel with resistor 88 disposed in the holding circuit extending over conductor 191. At contact 198*y* relay Y prepares a circuit for relay X, which carries out switching operations in the final relay set ER only incident to toll calls.

The call is built up as usual and as already described. If the private branch exchange line MA5 is the first idle one of the private branch exchange lines reserved exclusively for toll calls, a test circuit will become effective after energization of relay N, which extends 33. from ground, contact 128*x*, winding I of relay P, contacts 126*n*, 102*k*31, 124*pze*, contacts closed by the number or decade relays in final register EZE1, units conductor *ea*, contacts closed in the marker LEF, toll marker conductor ma5 to Fig. 2, contact 176*t*5, winding of relay K*a*5, conductor 6 to Fig. 3, contact 7*spl* and winding of relay A*n* to battery.

Relay P in the final selector relay set (Fig. 5) initiates the setting up of the talking path, as described before. Relay K*a*5 (Fig. 2) closes its contact 199*ka*5, thereby giving the coupling signal by connecting ground to windings I of relays $K5^1$, $K5^2$ . . . $K5^6$ of the intermediate lines. Relay A*n* (Fig. 3) of the allotter initiates the selection of an idle intermediate line. If intermediate line ZL*t*5 is the first line found idle, relay Q*e*5 (Fig. 3) will energize in a circuit corresponding to circuit No. 25. Relays C5 and Q5 will energize. Relays $K5^5$ disposed at the branching point of private branch exchange line MA5 and intermediate line ZL*t*5 will energize. The coupling is effected by closure of contacts 200*k*$5^5$, 201*k*$5^5$ and 202*k*$5^5$.

The connection is thereafter in previously described manner completed over branch line 3.ZL*e*6 of intermediate line ZL*t*5, which serves for incoming calls.

It shall now be assumed that

*The private branch exchange lines reserved for toll calls are busy*

It shall further be assumed that private branch exchange line MA2, normally serving for local calls, is idle.

Contacts 177*t*5, 179*t*4, 181*t*3 and 182*t*2 are in such circumstance closed. The toll call testing will then take place over circuit 34. from toll marker conductor *ma*5, contacts 177*t*5, 179*t*4, 181*t*3, 182*t*2, winding *I* of toll-busy relay F2, contacts 131*ar*2, 132*t*2, winding I of coupling start relay K*a*2, conductor 6 to Fig. 3, contact *y*7*spl* and winding II of relay A*n* to battery.

In addition to relays P (see ER in Fig. 5), K*a*2 (Fig. 2) and A*n* (Fig. 3), there will also be energized relay F2 in the subscriber's line relay set of private branch exchange line MA2. Relay F2 prepares at its contact 203*f*2 a circuit for energization of its holding winding II and, by opening its contact 186*f*2 and closing its contact 189*f*2, it marks the associated private branch exchange line MA2 as being busy in a toll call, such marking being effective in the contact chain for toll calls, which is affected only when all private branch exchange lines are occupied.

The toll call is completed in usual manner, as already described. The holding circuit for relay F2 will be completed upon energization of relay T2 in circuit No. 30 and will extend 35. from ground, contacts 203*f*2, 204*t*2, winding II of relay F2 to battery.

Relay F2 remains energized for the duration of the toll call.

*Toll call to private branch exchange line MA3 engaged in a local call*

The contact chain disposed in the toll-call control path and controlled by the T-relays of the several private branch exchange lines is switched through, if all private branch exchange lines are busy. Toll-control conductor *ma*5 will then be connected to an auxiliary relay FU1. If it is assumed that private branch exchange line MA3 is occupied by a local call, and if a start or marker signal is received over toll-control conductor *ma*5, signalling the need for completing a toll call, coupling relay K*a*3 (Fig. 2) and relay P in the final relay set (Fig. 5) will not be able to operate on account of the high resistance of relay F*u*1 in the subscriber's relay set TRS. Only relay A*n* in the allotter LO will energize and will prevent completion of another coupling signal while initiating the selection of the subscriber's intermediate line ZL*t* which is to be used. Relay E*l* in the final relay set remains shunted by contact 150*p*, since relay P failed to operate. Contact 205*p* of relay P also remains at normal, and relay X will therefore energize in a circuit 36. from ground, contact 127*c*31, 206*per*, 207*e*1, 131*u*, 205*p*, 198*y* and winding I of relay X to battery.

Relay X closes its contact 208*x* to place its winding I in a holding circuit. At contact 209*x* relay X connects its opposing winding II to conductor 158; at contacts 160*x* and 125*x* it respectively disconnects relay S and ground from winding I of relay P; and at contact 210*x* it connects winding I of relay P in series with its winding II, which is connected to a suitable high direct current potential FS*p*. The toll-test will now become effective over a circuit 37. from the high-potential direct current source FS*p*, winding II of relay P, contact 210*x*, winding I of relay P, contacts 126*n*, 102*k*31, 124*pze*1, contacts in EZE and LEF closed in accordance with the final digit of the called private branch exchange, toll marker or start conductor *ma*5 to Fig. 2, contacts 177*t*5, 179*t*4, 181*t*3, 183*t*2, 184*t*1, winding of relay FU1, contacts 185*f*3, 211*t*3, winding I of relay K*a*3, conductor 6 to Fig. 3, contact 7*sp*1 and over winding of relay A*n* to battery.

Relays P, FU1 and K*a*3 now energizes. Coupling start relay K*a*3 produces the coupling signal. Relay FU1 connects at its contact 212*fu*1 auxiliary relay FUH1 which is slow to release and which, upon energization, closes its contact 213*fuh*1.

It shall be assumed now that private branch exchange line MA3 is occupied in a call in outgoing direction, which extends over intermediate line ZL*t*1, 1.ZL*v*1 to relay set WR1 in Fig. 4. The toll call to private branch exchange line MA3 is over intermediate line ZL*t*4 and branch line 3.ZL*e*7 completed as already described. The coupling of line ZL*t*4 with line MA3 is effected by relay $K3^4$ over its contacts 216*k*$3^4$, 217*k*$3^4$, 218*k*$3^4$.

Test relay P*er* in the final relay set energizes in a circuit over conductor 152, windings of the coupling relays in EK of the final selection stage, conductor 153 to 3.ZL*e*7 in Fig. 3 and contact 219*qe*4 to ground. Holding circuit No. 30 cannot become effective over winding II of relay P*er* because contact 160*x* is open. Accordingly, relay S cannot energize after opening of contact 169*p*. A local holding path is now completed for relay P*er*, which extends over the circuit 38. from ground, contacts 220*c*31, 221*per*, 222*s*, 223*a*2, resistor 224, winding I of relay P*er* to battery.

The opposing winding II of relay X is now connected in parallel with winding II of relay C21 and relay O1 in relay selector set WR1 (Fig. 4), which is connected with private branch exchange line MA3 in the existing local call, the parallel circuit extending 39. from ground, winding of meter Za3 (Fig. 2), winding II of relay AR3, winding of relay T3, contact **225*k*3, winding II of relay $K3^1$, conductor 75 to Fig. 3, and then over winding III of relay C1, conductor 75' to Fig. 4, contact 62*k*11, winding II of relay K11, winding II of relay C11, contact 65*k*21, winding II of relay K21, winding II of relay C21 . . . contact 76*c*21 and over winding of relay O1 to battery; and parallel thereto there is a circuit over contact 218*k*3⁴ (Fig. 2), then over winding II of relay $K3^4$, conductor 226 to Fig. 3, winding III of C4, conductor 157 to Fig. 5, holding windings of the coupling relays in EK of the final selecting stage (Fig. 5), contacts 227*c*3, 209*x***, opposing winding II of relay X to battery.

The current in opposing winding II of relay X is too weak to overcome the current flowing in winding I thereof. The contacts of relay X accordingly remain operated. Relay S does not operate and contact **169*s* therefore remains at rest, and no ringing current is transmitted to the called line. The toll operator does not receive the idle signal and, by its absence, recognizes that the connection has been extended to a line which is engaged in a local call. It is understood of course that a special busy signal may be provided, if desired. The toll operator actuates a suitable key to connect battery to conductor 228. Relay B2 now energizes in a circuit 40. from battery, conductor 228, 212, contact 113*s***, winding I of relay B2 to ground.

Relay B2 closes its contacts **229*b*2 and 230*b*2, thereby bridging the open contacts 167*s* and 168*s*, thus connecting the talking conductors through. The toll operator is now connected in the local call. She informs the local parties that a toll call is waiting for connection to the private branch exchange. If the local parties hang up without any delay, relay C21, which has been energized in circuit No. 39, will deenergize, and the opposing winding of relay X will receive sufficient current and will now operate to cause release of the armature of relay X to restore its contacts. Accordingly, contact 160*x* will be closed and contacts 208*x* and 209*x*** will be opened. A circuit is now effective which corresponds to circuit No. 30. This circuit causes energization of the holding winding II of relay P*er* and of relay S. The latter relay closes its contacts **167*s* and 168*s* to cut the talking conductors through. Ringing current will be transmitted as previously described. Relay S also opens contact 222*s***, thereby interrupting the previously operable local holding circuit No. 38 for relay P*er*.

If the local parties do not hang up, the toll operator may terminate the local call by placing ground on conductor 192, while leaving battery connected to conductor 228. Circuit No. 40, in which relay B2 energized, therefore remains operative, and relay A2 is energized over its winding I in a circuit 41. from ground, conductor 192, conductor 111, contact **110*s*, contacts 109*h* and 231*x*** in parallel, over winding I of relay A2 to battery.

Relay A2 actuates its contact **234*a*2 to cause relay H to energize over its winding II in a circuit 42. from ground, contacts 127*c*31, 232*per*, 233*s*, 234*a*2**, winding II of relay H to battery.

Relay H actuates its contacts **235*h* and 236*h* to connect ground to talking conductors 237 and 238. Since the subscriber wanted by the toll operator is the one who is the calling party in the local call to be terminated, the relay B1 in the relay set WR1 (Fig. 4) will deenergize, while relay A1 remains operated. Winding II of relay C21 will now be shunted over contacts 239*a*1 and 240*b*1, and C21 deenergizes and opens its contact 76*c*21, thereby interrupting the parallel circuit to the opposing winding II of relay X in Fig. 5, which extended over circuit No. 39. The opposing winding of relay X now receives current and the armature of the relay is released to restore all contacts controlled thereby, including contact 160*x***, which closes a holding circuit for relay P*er* over its winding II. Relay S energizes and interrupts the local holding circuit No. 38 for winding I of relay P*er*.

At the time when connection was made with private branch exchange line MA3, relay FU1 energized in circuit No. 37. Relay FU1 will deenergize responsive to deenergization of coupling relay K31 (which opens circuit No. 37 at its contact **102*k*31**) and opening of circuit No. 17 and energization of relay P*er* which interrupts the circuit of K31 at contact **93*per*. The circuit of relay FUH1 is interrupted at contact 212*fu*1. Relay T3 is energized and, while FUH1 is still operative, the toll-busy relay F3 will be actuated over its winding II in a circuit 43. from ground, contacts 215*fu*1, 213*fuh*1, conductor 214, contacts 241*ka*1, 243*t*3**, winding II of relay F3 to battery.

Relay F3 closes a holding circuit for itself at its contact **243*f*3 and marks private branch exchange line MA3 toll-busy, by opening its contact 185*f*3. At contact 188*f*3** relay F3 switches the second contact chain in the toll-marking path to private branch exchange line MA2. This latter line, if busy in a local call, will be seized by the next incoming toll call.

A resistor 244 may be provided in the toll-marker conductor *ma*5, as shown in Fig. 2 in dotted lines, to prevent extension of calls to the private branch exchange by local subscribers calling the toll number of such private branch exchange.

Test relay P in final relay set ER (Fig. 5) cannot operate incident to the selection of toll-marker conductor *ma*5. If the calling party is a subscriber connected to the local exchange, he will receive busy tone. But, in case of a toll call, the nonoperation of relay P will cause energization of relay X, and the high potential source FS*p* will be connected to windings I and II of relay P. If an idle private branch exchange line serving toll calls or local calls, respectively, is still available, relay X will become instantly inoperative responsive to energization of its opposing winding in the circuit over conductor 158. Reference is in this connection made to circuit No. 39. The circuits for the holding winding II of relay P*er* and for relay S are completed, as already described. The call is extended. The toll operator receives the line-idle signal and knows therefore that she has been connected with an idle private branch exchange line.

*Modified chain circuit: Fig. 6*

If all private branch exchange lines are busy, the lines serving local calls will be seized for toll calls in a sequence (MA3, MA2, MA1) which is reverse from the sequence (MA1, MA2, MA3) in which these lines are taken into use for local calls over the chain formed by the contacts of relays T.

Fig. 6 shows that the lines serving local calls, if busy, may for toll calls be seized in the same sequence as for local calls.

If all private branch exchange lines MA1 . . . MA5 are busy, the toll-marker or toll-seizure conductor *ma*5 is switched through to relay FU1 over contacts **177*t*5, 179*t*4, 181*t*3, 183*t*2, 184*t*1. In case private branch exchange line MA1 is engaged in a local call, an incoming toll call will be switched to such locally busy line by seizure thereof over contact 245*f*1**. Assuming line MA2 to be engaged in a local call, toll-marker conductor *ma*5 will then be switched through to such line MA2 over contacts **246*f*1, 247*f*2**. After line MA2 is taken into use for a toll call, the chain for *ma*5 will be connected through to line MA3 over contacts **248*f*2 and 249*f*3**.

It will be seen from the foregoing explanations that the invention provides for use in signalling systems, and especially automatic telephone systems of the relay type, circuit-switching means for extending preference calls to private branch exchanges having a plurality of private branch exchange lines, said circuit-switching means comprising a control or locking relay such as relay F2 for each private branch exchange line, means responsive to the seizure of a private branch exchange line, e. g., line MA2, for a preference call, e. g., over contacts **182*t*2 and 131*ar*2, for energizing such control or locking relay and means governed by such control or locking relay for definitely locking the associated private branch exchange line against seizure for extending subsequent preference calls thereto. Another feature of the invention provides for a special circuit path for the energization of such control or locking relay, e. g., relay F2, over contacts such as 182*t*2**, which circuit path becomes effective only incident to extending a preference call to the corresponding private branch exchange line, such special circuit path extending over a special marker or seizure conductor such as *ma*5. A further feature provides a chain contact circuit including contacts **180*t*3/181*t*3, 182*t*2/183*t*2 and 82*t*1 over which the private branch exchange lines are in preference calls reached in a sequence, e. g., the sequence MA3, MA2, MA1, which is reverse from the sequence MA1, MA2, MA3 incident to the seizure thereof for ordinary calls, such chain contacts being formed by contacts of the individual cutoff relays of said private branch exchange lines. Still another feature has to do with the provision of an additional contact chain comprising contacts such as 185*f*3/188*f*3, 186*f*2/189*f*2 and 187*f*1** shown in Fig. 2, for extending the marker conductor *ma*5 for preference calls only to private branch exchange lines which are involved in ordinary calls, the contacts of said additional chain being contacts associated with the preference locking relays F3, F2, F1 in the event that all private branch exchange lines MA1 . . . MA5 of a private branch exchange should happen to be busy.

The features summarized above and additional new features of the invention are more particularly pointed out in the accompanying claims.

An example of a "preference call" is a—toll call—; an example of an "ordinary call" is a—local call—. The invention is particularly adapted for and has been particularly provided for an automatic telephone system of the relay type as described herein. It will be understood, however, that the invention may be used in other signalling systems. Some of the features of the invention may be employed in signalling systems, including telephone systems of different specific types. The specfic designations employed in the accompanying claims are therefore intended in a limiting sense only insofar as they denote corresponding specific or inherent limitations.

Changes may be made within the scope and spirit of the appended claims.

I claim:

1. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, and a chain circuit governed by contacts controlled by said locking relays, said chain circuit being effective at a time when all of said private branch exchange lines are busy for extending toll calls only to such of said lines that are involved in local calls.

2. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, and a chain circuit governed by contacts controlled by said cut-off relays for extending toll calls to said lines in a sequence which is reverse from the sequence of extending local calls thereto.

3. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, and a second chain circuit governed by contacts controlled by said locking relays, said second chain circuit being effective at a time when all of said lines are busy for extending toll calls only to such of said lines that are involved in local calls.

4. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, and relay means common to all lines leading to said private branch exchange for controlling the actuation of said locking relays of lines involved in local calls to determine the line which is to be seized for a toll call subsequently extended to said private branch exchange.

5. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, relay means common to all lines leading to said private branch exchange for controlling the actuation of said locking relays of lines involved in local calls to determine the line which is to be seized for a toll call subsequently extended to said private branch exchange, and circuit means controlled by said relay means for closing a circuit for the locking relay of the locally busy line that is to be seized for said subsequent toll call.

6. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, and contacts included in said second chain circuit for governing the extension of toll calls to said locally busy lines in a predetermined order of seizure thereof which is different from the order of seizure of said lines for local calls.

7. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, and contacts included in said second chain circuit for governing the extension of toll calls to said locally busy lines in a predetermined order of seizure thereof which corresponds to the order of seizure of said lines for local calls.

8. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, and relay means common to all lines leading to said private branch exchange for controlling the actuation of said locking relays of lines involved in local calls to determine the line which is to be seized for a toll call subsequently extended to said private branch exchange, said common relay means comprising a quick-acting relay responsive to said signal, a slow-acting relay controlled by said quick-acting relay to cause deenergization thereof, said relays cooperating to close during the deenergization interval of said slow-acting relay the energizing circuit of the locking relay of a locally busy line that is to be seized for said subsequent toll call.

9. In an automatic telephone system of the relay type having lines leading to a private branch exchange, switching devices for respectively extending to said lines local calls and toll calls, said switching devices comprising a marker and a toll call marking conductor extending therefrom and leading to said private branch exchange, means in said marker for connecting a signal to said toll call marking conductor at a time when a toll call is extended to any one of said lines, a locking relay for each of said lines, circuit means including said marker conductor for energizing the locking relay associated with a line to which a toll call is extended by said switching devices, circuit means controlled by the corresponding locking relay for locking the associated line against seizure for a toll call subsequently extended to said private branch exchange, a cut-off relay for each of said lines, a chain circuit governed by contacts controlled by said cut-off relays for extending toll calls to said lines in a sequence which is reverse from the sequence of extending local calls thereto, a second chain circuit governed by contacts controlled by said locking relays, said second chain circuit being effective at a time when all of said lines are busy for extending toll calls only to such of said lines that are involved in local calls, relay means common to all lines leading to said private branch exchange for controlling the actuation of said locking relays of lines involved in local calls to determine the line which is to be seized for a toll call subsequently extended to said private branch exchange, said common relay means comprising a quick-acting relay responsive to said signal, a slow-acting relay controlled by said quick-acting relay to cause deenergization thereof, said relays cooperating to close during the deenergization interval of said slow-acting relay the energizing circuit of the locking relay of a locally busy line that is to be seized for said subsequent toll call, and a coupling start relay for said locally busy line, and circuit means for energizing said coupling start relay together with said quick-acting relay to prepare the energizing circuit of the corresponding locking relay.

References Cited in the file of this patent

UNITED STATES PATENTS

| | | |
|---|---|---|
| 1,559,244 | Gibson | Oct. 27, 1925 |
| 1,595,132 | Williams | Aug. 10, 1926 |
| 1,956,610 | Belas et al. | May 1, 1934 |
| 2,431,850 | Voss | Dec. 2, 1947 |